United States Patent
Chaturvedi

(10) Patent No.: US 12,247,109 B2
(45) Date of Patent: Mar. 11, 2025

(54) BIODEGRADABLE POLYMERIC SUBSTRATE AND A METHOD OF PRODUCING THE SUBSTRATE

(71) Applicant: Ashok Chaturvedi, New Delhi (IN)

(72) Inventor: Ashok Chaturvedi, New Delhi (IN)

( * ) Notice: Subject to any disclaimer, the term of this patent is extended or adjusted under 35 U.S.C. 154(b) by 151 days.

(21) Appl. No.: 17/288,183

(22) PCT Filed: Oct. 19, 2019

(86) PCT No.: PCT/IN2019/050772
§ 371 (c)(1),
(2) Date: Apr. 23, 2021

(87) PCT Pub. No.: WO2020/084632
PCT Pub. Date: Apr. 30, 2020

(65) Prior Publication Data
US 2021/0403663 A1    Dec. 30, 2021

(51) Int. Cl.
| | | |
|---|---|---|
| *C08J 7/06* | (2006.01) | |
| *B65D 65/40* | (2006.01) | |
| *B65D 65/42* | (2006.01) | |
| *B65D 65/46* | (2006.01) | |
| *C08J 7/18* | (2006.01) | |
| *C09D 7/20* | (2018.01) | |

(Continued)

(52) U.S. Cl.
CPC .............. *C08J 7/06* (2013.01); *B65D 65/40* (2013.01); *B65D 65/42* (2013.01); *B65D 65/466* (2013.01); *C08J 7/18* (2013.01); *C09D 7/20* (2018.01); *C09D 189/00* (2013.01); *C08J 7/08* (2013.01)

(58) Field of Classification Search
CPC ....... C08J 7/06; C08J 7/18; C08J 7/08; C09D 7/20; C09D 189/00; B65D 65/40; B65D 65/42; B65D 65/466
See application file for complete search history.

(56) References Cited

U.S. PATENT DOCUMENTS

| | | |
|---|---|---|
| 8,513,329 B2 | 8/2013 | Lake et al. |
| 9,382,416 B2 | 7/2016 | Lake et al. |

FOREIGN PATENT DOCUMENTS

| | | | | |
|---|---|---|---|---|
| JP | 06322263 A | * | 11/1994 | |
| WO | WO-9719763 A1 | * | 6/1997 | .............. B41F 23/00 |
| WO | WO-0243956 A2 | * | 6/2002 | .......... A22C 13/0013 |

(Continued)

OTHER PUBLICATIONS

English translation of JP-06322263.*

(Continued)

*Primary Examiner* — Robert S Walters, Jr.
(74) *Attorney, Agent, or Firm* — Dinsmore & Shohl LLP

(57) ABSTRACT

The present invention discloses a method of making a non-biodegradable flexible packaging substrate biodegradable. The method comprises the steps of (i) providing a substrate web from an unwind to a coating station (402), (ii) applying thin layer of uniform deposition of a curable coating on at least one surface of the substrate partially or completely by the coating station wherein the external surface of the substrate is essentially coated, (iii) curing the coating applied on the substrate web by a curing unit, and (iv) collecting the coated substrate web in roll at rewind. Further, the thickness of the thin layer of uniform deposition is in the range of 0.01 gsm to 10 gsm.

15 Claims, 3 Drawing Sheets

(51) Int. Cl.
    *C09D 189/00*      (2006.01)
    *B29C 71/02*       (2006.01)

(56)         References Cited

FOREIGN PATENT DOCUMENTS

WO       2011044669  A1      4/2011
WO    WO-2013102918  A2  *   7/2013    ............. B32B 15/08
WO       2014079844  A1      5/2014
WO    WO-2019050768  A1  *   3/2019    ............... B05C 9/04

OTHER PUBLICATIONS

International Search Report in reference to co-pending Indian Patent Application No. PCT/IN2019/050772 filed Oct. 19, 2019.
Written Opinion in reference to co-pending Indian Patent Application No. PCT/IN2019/050772 filed Oct. 19, 2019.

* cited by examiner

BIODEGRADABLE POLYMERIC SUBSTRATE AND A METHOD OF PRODUCING THE SUBSTRATE

CROSS-REFERENCES TO RELATED APPLICATIONS

This application is a national-stage application under 35 U.S.C. § 371 of International Application No. PCT/IN2019/050772, filed Oct. 19, 2019, which international application claims the benefit of priority to Indian Patent Application number 201811040463, filed Oct. 26, 2018.

FIELD OF THE INVENTION

The present invention relates to biodegradable monolayer or multilayer polymeric flexible substrate having enzyme based coating on top and/or bottom surfaces. More particularly invention relates to a polymeric flexible substrate coated with an enzyme based composition to make them biodegradable and a method of applying a thin layer of uniform deposition of the enzyme based coating on non-biodegradable polymeric flexible substrate for inducing biodegradability in the substrate. The coated substrate may be used for various single-use disposable applications for short-lived products such as sachets, bags, packaging including formed trays, boxes, agricultural films, articles of expanded polystyrene etc. that are discarded after use.

BACKGROUND

Plastics are typically organic polymers of high molecular mass. They are usually synthetic and made by polymerisation, most commonly derived from petrochemicals. Plastics are inexpensive, durable and easy to process substances compared to the other options, which are employed to manufacture a variety of products that find usage in a wide range of applications. As a consequence, the production of plastics has increased dramatically over the last few decades. Because of the durability of the polymers having high resistance to degradation (due to high molecular mass values, hydrophobicity and crystallinity), despite being recyclable, substantial quantities of disposable plastics are piling up in landfill sites and in natural habitats, generating increasing environmental problems worldwide.

To answer these problems, different physical, chemical and/or biochemical approaches have been developed to reduce the biodegradation resistance of polymers and to increase their biodegradation rate. For example, enzyme based additives have been introduced which are mixed/blended with polymer resin during polymer manufacturing stage or with the polymer granules during processing to make biodegradable polymer substrate.

Enzymes are natural protein molecules that act as highly efficient catalysts in biochemical reactions, that is, they accelerate chemical reaction and increase efficiency. Enzyme based compositions dispersed in the polymer substrate during manufacturing attracts microbes to form a layer over the surface of the substrate. The microbes colonized on the plastic surface utilize the carbon backbone of the polymer chain as an energy source.

The enzyme based additive mixed with polymer resin is not utilized fully and a small portion of the total additive mixed, which is present only on the surface of the flexible substrate, attract the microbes and depletes the surface and reduces the substrate thickness layer by layer. Hence most of the additive blended during manufacturing remains within the thickness of the substrate is not utilized as shown in FIG. 1. The cost of dosing the additive by this method increases the cost of making biodegradable polymer as most of the additive blended during manufacturing reside inside the surface of the substrate and thus go waste.

Thus due to high cost of the additive consumed in making biodegradable Polymer substrate and its limitation to convert pre-manufactured Polymeric substrate to biodegradable substrate, there is a need of improved process to make/convert non-biodegradable polymeric substrate to biodegradable substrate at a fraction of cost that of the prior art.

SUMMARY OF THE INVENTION

The present invention describes a biodegradable monolayer or multilayer polymeric flexible substrate having enzyme based coating on top and/or bottom surfaces and a method of coating an enzyme based coating to convert non-biodegradable Polymer substrate into biodegradable polymer substrate.

The present invention relates to a method to apply a thin layer of uniform deposition of enzyme based coating on at least one surface of the polymer substrate to induce biodegradation without loss of physical strengths, structural characteristics. The present invention requires quite less amount of enzyme based formulation compared to that of the prior art and thus make the process cost effective. The present invention requires up to 90% less amount of enzyme based formulations compared to that of the prior art as the formulations are only coated on the surface of the substrate.

Enzymes are natural protein molecules that act as highly efficient catalysts in biochemical reactions, that is, they help a chemical reaction take place quickly and efficiently. Studies show that the enzymes present in the enzyme based coating attracts microbes over the product surface and colonizes on the surface of the plastic forming a biofilm. Therefore, when the enzyme based additives are coated on the surface, the accumulation of microbes is increased and faster in comparison to substrates with dispersed additives.

Once the microbes have colonized on the substrate surface they secrete acids and/or enzymes that break down the polymer chains. The microbes utilize biodegradable polymers as the substrate in unavailability of microbial nutrients.

Thus enzymatic biodegradation of polymer involves (a) Adherence of the microorganisms to plastic surface, adherence leads to the formation of biofilms; (b) Growth of microorganisms by utilizing the degraded polymer as an energy and food source (Assimilation); (c) Degradation of polymer (Fragmentation by hydrolysis); and (d) Final disintegration of polymer (Mineralization).

The biodegradation mechanism of polymers occurs by oxidation or hydrolysis by various enzymes secreted by microorganisms to create functional groups that improve its hydrophobicity. Thereby, high molecular weight plastic polymers are degraded into low molecular weight compounds having delicate mechanical properties, thus, making it more accessible for further microbial assimilation.

Enzymes play a major role in microbial degradation of plastics where microbial exoenzymes degrade complex polymers into small molecules of short chain length as monomers, dimers and oligomers, which are capable of passing through the semi-permeable bacterial/fungal membranes where they can be utilized as carbon and energy sources and further mineralized. If the size of these cleaved polymers is too large, then they are first depolymerized to pass through the cellular membrane, where they can be absorbed and biodegraded by intracellular enzymes within microbial cell.

According to another embodiment a method of applying a thin layer of uniform deposition of an enzyme based coating on at least one surface of a flexible substrate to make it biodegradable, the method comprising:
a. providing a substrate web from an unwind to a coating station;
b. applying a thin uniform layer of a curable coating by the coating station;
c. curing the coating applied on the substrate web online, by a curing unit; and
d. rewinding the coated substrate web in roll,
wherein the thin layer of uniform coating is in the range of 0.01 gsm to 10 gsm.

The formulation of the enzyme based coating may include, but not limited to, natural peptides/enzymes/proteins obtained from biological sources such as plant or vegetables etc. The coating formulation may be an water or solvent based. The enzyme based coating formulation may include colours based on requirement. The enzyme based coating formulations may also include a bio marker or any other type of covert marker to incorporate a mechanism to detect/identify/differentiate coated biodegradable flexible substrate from non-biodegradable flexible packaging substrate. The enzyme based coating may be applied using any known method in the art such as, but not limited to, rotogravure, flexography, spraying, inkjet, dipping, screen printing etc. The enzyme based coating may be applied on all type of polymeric flexible substrate webs such as, but not limited to, PE, PP, PET, Nylon, Polystyrene including foamed, PU, PVC, PC etc.

BRIEF DESCRIPTION OF THE DRAWINGS

These and other advantages and features of the present invention, as well as methods of operation and economies of manufacture, will become apparent to one skilled in the art to which the present invention pertains based upon the following detailed description and the appended drawings, all of which form a part of this application. In the drawings.

DETAILED DESCRIPTION OF THE PRESENTLY PREFERRED EMBODIMENTS

While the present invention has been described in connection with what are currently considered to be the most practical and preferred embodiments, it is to be understood that various arrangements and alternative embodiments are intended to be included within the scope of the appended claims.

Figure 1:
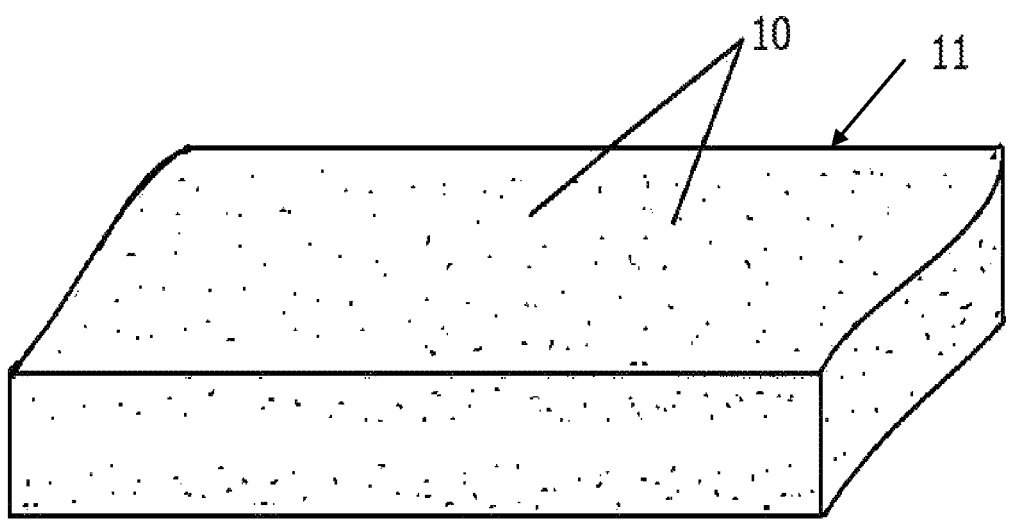
FIG. 1 shows the presence of enzyme based additive dispersed in the entire thickness of the substrate as known in the art.

As shown in FIG. 1, the additives (10) are dispersed in the entire thickness of the substrate (11) and very less quantity of the additives is available on the surface of the substrate as discussed earlier in the background section.

The present invention provides a method for coating that converts non-biodegradable polymeric substrates into biodegradable at fraction of cost.

The present invention relates to a method of applying a thin uniform layer (101) of enzyme based coating/additives on at least one surface of the polymer substrate to induce biodegradability. The present invention requires quite less amount of enzyme based formulation compared to the prior art and thus make the process cost effective. The present invention requires up to 90% less amount of enzyme based coating formulations compared to the quantity used in the prior art. The coating is applied in roll-to-roll process.

Figure 2:
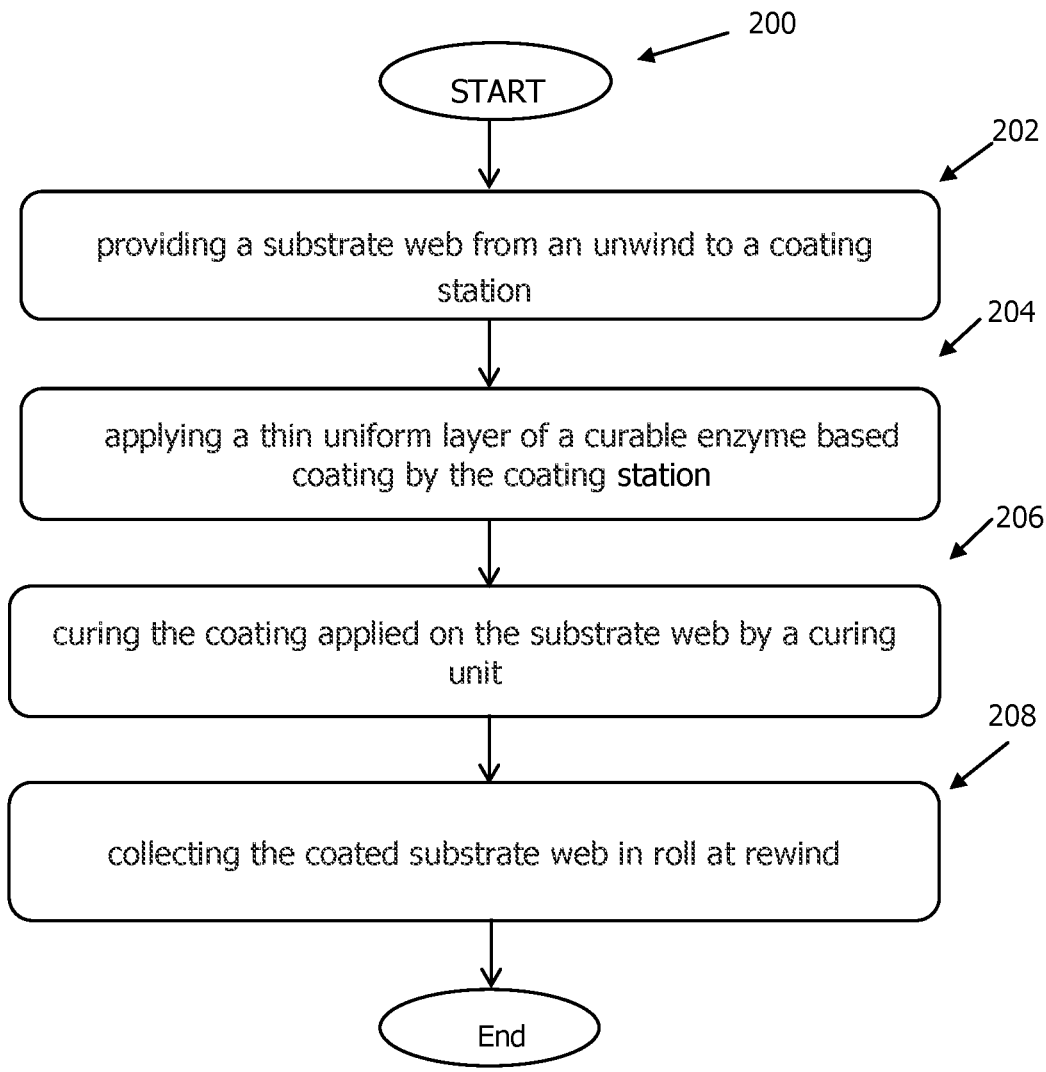
FIG. 2 is flow-chart depicting a method to apply a thin layer of uniform deposition of an enzyme based coating on at least one surface of a flexible substrate to make biodegradable flexible substrate, in accordance with an embodiment of the present invention.

FIG. 2 is flow-chart depicting a method (200) to apply a thin uniform layer of an enzyme based coating on at least one surface of a flexible substrate to make the substrate biodegradable, in accordance to an embodiment of the present invention. The method (200) comprising providing a substrate web from an unwind to a coating station at step (202); applying a thin uniform layer of a curable coating by the coating station at step (204); curing the coating applied on the surface of substrate web by a curing unit at step (206); and collecting the coated substrate web in roll at rewind (208), wherein thickness of the layer of coating is in the range of 0.01 gsm to 10 gsm.

The non-biodegradable polymeric substrate web is introduced to the process as a supply roll on unwind for continuous feed to the coating process. The unwind holds the roll of the substrate to be coated and provides the substrate web to the coating station in line. The substrate web onto which the coating to be applied is passed through the coating station. The coating station(s) apply the enzyme based coating on one or both surfaces of the substrate web. Thereafter the coated substrate is passed through a curing unit in order to cure the coating applied before collecting the coated substrate in roll at rewind.

The coating may also be applied on the surface(s) of the substrate in-line during the production of substrate web at any suitable location, before collecting on the rewind. After coating of the surface(s), the coated substrate web is passed through curing unit to cure the coating.

It should be appreciated that one or both (interior and exterior) surfaces of the packaging substrate may be coated based on the requirement and/or food or product to packaged. In case of contamination sensitive product or food to be packaged, only exterior surface of the substrate is coated with the enzyme based coating having desired biodegradation effect.

To check the presence of enzyme based biodegradable coating on the substrate surface, unique biomarkers may be used in coating formulations, which can be detected using suitable means after application.

The flexible substrate may be single layer or multilayer films or laminates of at least one of the group of, but not limited to, PE, PP, PET, Nylon, Polystyrene including foamed, PU, PVC, PC etc. The coating may be applied by various methods known in the art. The coating stations may be based on rotogravure, flexography, spraying, inkjet, dipping, screen printing etc. The coating may be provided inline during the manufacturing of the substrate or offline after the substrate is formed.

In case of laminate there are multiple polymeric layers which may be a single layer film or multilayer films. At least one surface of at least one polymeric layer may be coated with enzyme based coating and then laminated together to form a laminate. Essentially the outer most exterior surface of the laminate is coated with the enzyme based coating to attract the bacteria to initiate the process. However, only at least the outside surface of the finished laminate may also be coated with the enzyme coating.

The coating is cured by curing unit that may be a hot air blower and/or radiation source such as but not limited to Electron Beam or UV lamp/LED.

The formulation of the enzyme based coating may include, but not limited to, natural peptides/enzymes/proteins obtained from edible biological sources such as plant or vegetables etc. The coating formulation may be solvent or water based.

Figure 3A:
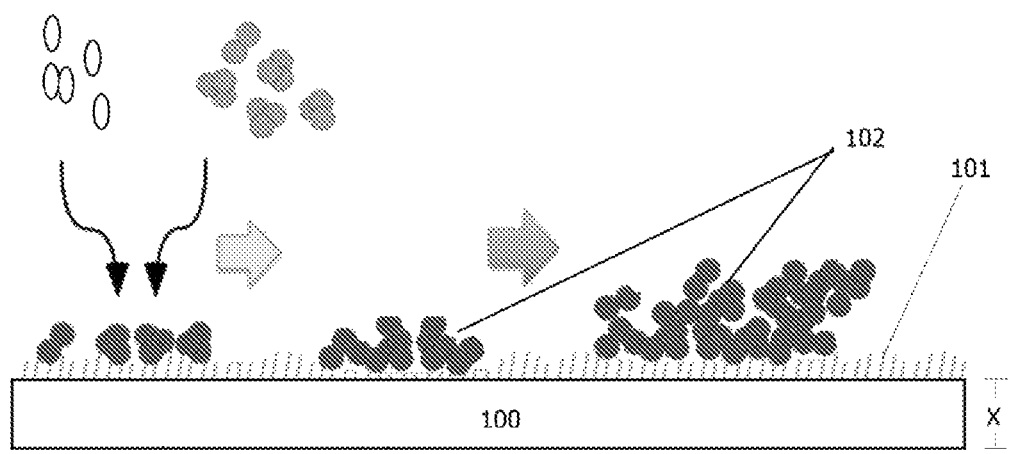
FIG. 3A-3C depicts different stages of biodegradation of the biodegradable polymeric flexible substrate made by applying enzyme based coating on one surface of the flexible substrate, in accordance with an embodiment of the present invention.
Figure 3B:
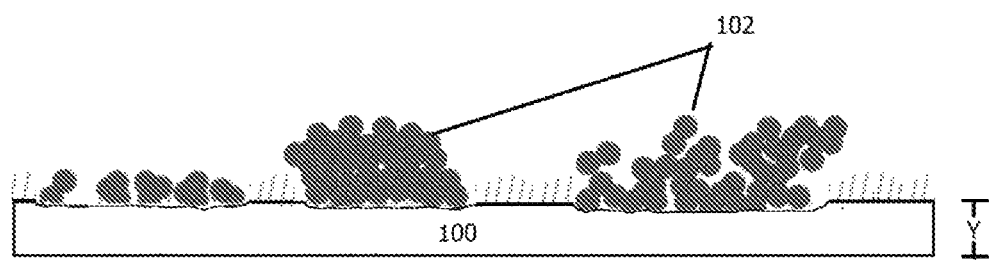
Figure 3C:
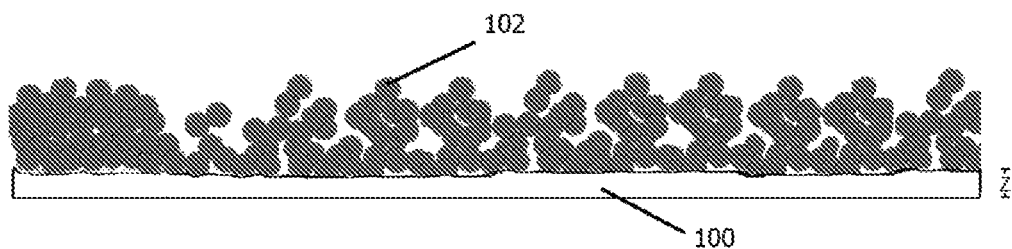

FIG. 3A-3C depict stages of biodegradation of the biodegradable polymeric flexible substrate, made by applying enzyme based coating (101) on one surface of the flexible substrate, under aerobic or anaerobic environmental condition in soil, in accordance with an exemplary embodiment of the present invention.

As shown in FIG. 3A when a product, such as packaging, made from the coated substrate is disposed of after the use, it comes in contact with soil. The microorganisms (102) such as bacteria, fungi etc. present in soil gets attracted towards the coated substrate due to the enzyme present in coating (101) on the surface of the substrate. The disposal of packaging or the substrate (100) in any other form in soil, where suitable microbes are found in abundance, initiate and propagate the process of biodegradation of polymeric surface. The microbes may be aerobic or anaerobic. Once the microbes are accumulated on the surface of the substrate, they start colony formation on the surface of the substrate. As depicted not all type of microbes succeed in colony formation, rather only specific type of microorganisms which can utilize the substrate as their food deposit on the substrate.

After colonisation, the microbes start fragmenting the substrate surface resulting in biodegradation of the coated substrate and the coated substrate starts depleting layer by layer thereby reducing the thickness of the substrate as depicted in FIGS. 3B & 3C.

Under aerobic conditions when oxygen is readily available, such as when the packaging remains on the soil open to atmosphere, aerobic heterotrophic micro-organisms are mainly responsible for the degradation of such polymers, with microbial biomass, $CO_2$, and $H_2O$ as the by-products. Under anaerobic conditions, when the packaging remains in landfills or enclosed spaces where oxygen is not available or is very low in concentration, anaerobic microorganisms are responsible for polymer degradation and the by products are microbial biomass, $CO_2$, $CH_4$ and $H_2O$ under methanogenic conditions.

The Speed of bio degradation is generally affected by type of polymer, environmental microbial conditions, the concentration of peptide/enzyme/protein in the enzyme based coating and the thickness of the substrate.

While the present invention has been described in connection with what are currently considered to be the most practical and preferred embodiments, it is to be understood that various arrangements and alternative embodiments are intended to be included within the scope of the appended claims.

I claim:

1. A method of making a non-biodegradable flexible packaging substrate web biodegradable, the method comprising:
    (a) providing the substrate web from an unwind to a coating station, wherein the substrate web comprises multiple polymeric layers;
    (b) applying a thin layer of uniform deposition of an enzyme based coating on only an outermost exterior surface of the substrate web partially or completely by the coating station;
    (c) curing the enzyme based coating applied on the substrate web by a curing unit, wherein the curing unit is one of:
        (i) a hot air blower; or
        (ii) an electron beam radiation source; or
        (iii) a UV lamp/LED radiation source; and
    (d) collecting the coated substrate web in roll at rewind, wherein:
        the thin layer of uniform deposition of the enzyme based coating is from 0.01 gsm to 10 gsm; and
        the enzyme based coating is configured to attract microorganisms to the outermost exterior surface of the substrate web, whereby the microorganisms colonize on the outermost exterior surface of the substrate web and secrete acids and/or enzymes that break down polymer chains of the substrate web to cause biodegradation of the substrate web.

2. The method of claim 1, wherein the substrate web is a laminate comprising the multiple polymeric layers, and wherein the laminates comprises at least one of polyethylene, polypropylene, polyethylene terephthalate, nylon, polystyrene, polyurethane, polyvinyl chloride, and polycarbonate.

3. The method of claim 1, wherein the enzyme based coating is a coating formulation having: natural peptides obtained from edible biological sources; or enzymes obtained from edible biological sources; or proteins obtained from edible biological sources.

4. The method of claim 3, wherein the coating formulation is water or solvent based.

5. The method of claim 3, wherein one or more markers is used with the coating formulation to detect the presence of the enzyme based coating on the outermost exterior surface of the substrate web.

6. The method of claim 5, wherein the marker is a biomarker.

7. The method of claim 5, wherein the marker is a covert marker.

8. The method of claim 1, wherein the coating station is based on rotogravure, flexography or spray, inkjet, dipping, or screen printing process.

9. The method of claim 1, wherein the curing unit is the hot air blower.

10. The method of claim 1, wherein degradation of the biodegradable flexible packaging substrate begins under aerobic or anaerobic environmental condition.

11. The method of claim 1, wherein the curing unit is either the electron beam radiation source or the UV lamp/LED radiation source.

12. The method of claim 11, wherein the curing unit is the electron beam radiation source.

13. The method of claim 11, wherein the curing unit is the UV lamp/LED radiation source.

14. The method of claim 1, wherein the enzyme based coating is applied on the outermost exterior surface of the substrate web inline during manufacturing of the substrate web in a roll-to-roll process.

15. A biodegradable flexible packaging substrate web obtained by the method according to claim 1.

* * * * *